US005649367A

United States Patent [19]

Hille et al.

[11] Patent Number: 5,649,367

[45] Date of Patent: Jul. 22, 1997

[54] CHAIN SAW GUIDE BAR WITH IDENTIFYING INDICIA

[75] Inventors: Arvin A. Hille, West Linn; Robert J. Penberthy, Gladstone, both of Oreg.

[73] Assignee: Blount, Inc., Portland, Oreg.

[21] Appl. No.: 649,211

[22] Filed: May 16, 1996

[51] Int. Cl.[6] .......................... B23D 59/00; B27B 17/02

[52] U.S. Cl. .......................................... 30/387; 30/383

[58] Field of Search .......................... 30/383, 384, 385, 30/386, 387; 83/701

[56] References Cited

U.S. PATENT DOCUMENTS

| | | | |
|---|---|---|---|
| 3,810,408 | 5/1974 | Taira | 30/387 |
| 4,693,007 | 9/1987 | Apfel et al. | 30/387 |
| 5,035,058 | 7/1991 | Date et al. | 30/387 |

OTHER PUBLICATIONS

Stihl—Bar and Chain Information Instructions for ANSI B175.1.

*Primary Examiner*—Hwei-Siu Payer
*Attorney, Agent, or Firm*—Robert L. Harrington

[57] ABSTRACT

A chain saw guide bar having identifying indicia to aid in the selection of a replacement guide bar and/or saw chain. A colored insert is installed in an aperture of the guide bar. The insert is colored to indicate the proper type of chain for the guide bar. Characters are stamped into the insert to indicate the mounting tail of the guide bar and the length of the saw chain required for the guide bar.

8 Claims, 1 Drawing Sheet

CHAIN SAW GUIDE BAR WITH IDENTIFYING INDICIA

FIELD OF THE INVENTION

This invention relates to chain saws and more particularly it relates to guide bars with color coded indicia for mating guide bars to other chain saw components.

BACKGROUND INFORMATION

Chain saws are popular and useful tools that are utilized by many industries and individual users. Probably the most common use of the chain saw is in cutting of wood products ranging from felling of trees, trimming branches from trees and sawing the logs resulting from the trees into lengths. Chain saws have also been applied to other industries such as the concrete or construction industry wherein the chain saw is utilized to saw such items as concrete and/or stone.

Basically the chain saw has a power head, a guide bar and an endless saw chain (a loop of chain). The guide bar is mounted to the power head and the endless chain is entrained around the guide bar with the chain having a drive link tang fitting in a groove of the guide bar. The saw chain is driven by a drive sprocket of the power head to propel the saw chain around the guide bar.

There are many different types of saw chain having reference to the gauge of the chain (the width of the drive link tang which must be fit to the guide bar groove) and pitch (the distance between rivets which must be fit to a particular sprocket type, e.g., a nose sprocket provided on the nose end of the guide bar and the drive sprocket of the power head).

The guide bars, drive sprockets and saw chain are replaceable since they are subject to wear and/or damage when in use. New guide bars most often have details imprinted, painted, and/or stenciled on the side surfaces of the guide bar to enable a user to match the bar to a particular chain and/or sprocket.

The guide bar when in use is generally subjected to a harsh environment. The guide bar of the chain saw will, for example, be traveling through the kerf produced by the saw chain and in the process the side surfaces of the guide bar will be rubbing against the material which is being sawn. Additionally, the guide bar is subjected to the lubricating oil which lubricates the guide bar and chain and will further be subjected to moisture, dirt and other items. The markings on the guide bar will over time through use of the guide bar generally be rubbed off or worn away.

When the details have been worn off the guide bar it is often difficult for a user (particularly a novice user) to identify a correct replacement guide bar and/or saw chain that is matched to each other and to the power head of the chain saw. The guide bar or saw chain may appear to be of the correct type however there are many different types of guide bars and saw chains that will appear similar to the untrained eye and the task of locating a desired replacement bar or chain can often be a frustrating experience particularly to a novice user.

BRIEF SUMMARY OF THE INVENTION

The present invention is a guide bar that has identifying indicia that remains visible even after extended use of the guide bar. A preferred embodiment of the guide bar of the present invention has a colored insert as the identifying indicia that is fixedly mounted into an aperture of the guide bar. The colored insert is finished flush with the surface of the guide bar and therefore does not interfere with or affect the performance of the guide bar. The colored insert has color that extends below the exposed surface (or even throughout) and will not wear off. The color is accordingly readily discernable throughout the use of the guide bar. The insert may be further stamped with other identifying characters such as letters and numbers where simple color does not provide the entire information required, e.g., to indicate bar mount design and/or chain loop length.

DESCRIPTION OF THE PREFERRED EMBODIMENT

Figure 1:
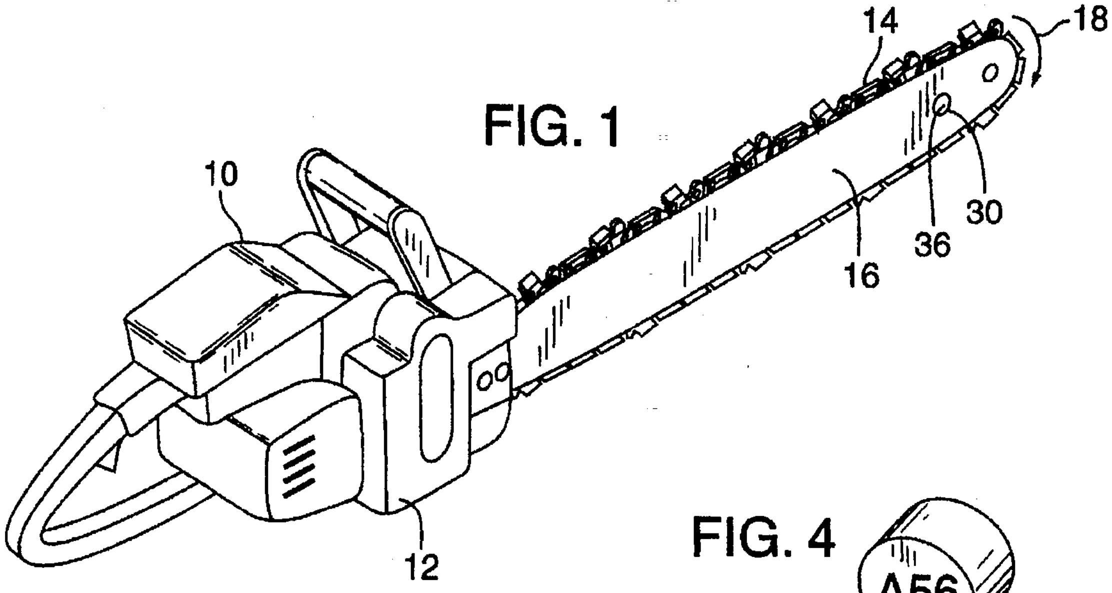
FIG. 1 is a perspective view of a chain saw incorporating the present invention.

Refer now to FIG. 1 of the drawings which illustrates a chain saw 10. The chain saw 10 has a power head 12, a guide bar 16 and an endless chain 14. The guide bar 16 is mounted to the power head 12 and the saw chain 14 is entrained around the guide bar 16. The guide bar 16 has a guide groove 24 (FIG. 2) for receiving the saw chain 14. The chain 14 is driven by a drive sprocket of the power head 12 (not shown in the figure) and the saw chain 14 travels around the guide bar 16 as indicated by the directional arrow 18. The guide bar 16 and the saw chain 14 are removably mounted to the power head 12 and are replaceable units.

Figure 2:
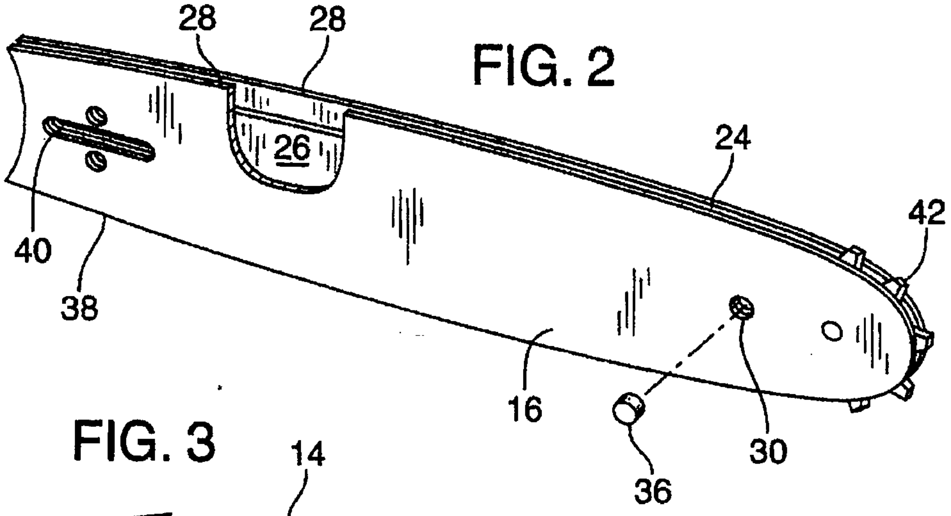
FIG. 2 is a view of the guide bar only of FIG. 1.
Figure 3:
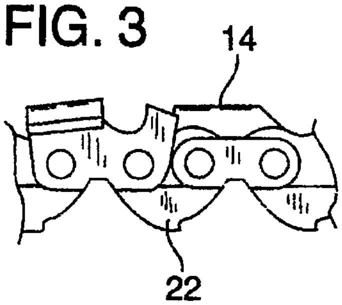
FIG. 3 is a view of a portion of saw chain mountable to the guide bar and chain saw of FIG. 1.

FIG. 2 further illustrates the guide bar 16 and FIG. 3 illustrates a portion of the saw chain 14. The guide bar 16 is an elongate member that has a mounting tail 38 suited for mounting the guide bar 16 to the power head 12 of FIG. 1. The nose end of the bar is provided with a nose sprocket 42. The saw chain 14 is an articulated chain and has drive links 22 with depending tang portions that are received in a guide groove 24 of the guide bar 16. The drive links 22 will also be engaged by the drive sprocket of the power head 12 to propel the endless chain 14 around the guide bar 16 and they engage the sprocket teeth of sprocket 42 which supports the chain as it rounds the nose of the bar. The endless saw chain 14 must be of the proper loop length and of the proper gauge (the tangs of the drive links 22 having a width that fits groove 24) and pitch (the tangs being spaced to fit the sprocket teeth determined by measurement of the rivet spacings) to be received both by the guide bar 16 and the drive sprocket of the power head 12.

One of the problems associated with replacing either or both of the guide bars 16 and the saw chain 14 is selecting the proper guide bar 16 to fit the power head 12 and/or the proper chain 14 to fit both the guide bar 16 and the drive sprocket of the power head 12.

FIG. 2 illustrates a guide bar 16 that is of laminated construction and has a center laminate 26 sandwiched between outer laminates 28. The center laminate 26 and the outer laminates 28 typically have an aperture 30 stamped or otherwise formed at the bar's nose end for purposes of locating the laminates during the manufacturing and assembly process. Slot 40 at the tail end and provided for mounting purposes serves also as a locating aperture in cooperation with aperture 30. After the laminates 26, 28 have been bonded together, the aperture 30, not serving any other useful purpose, was either left open or filled with metal and finished flush to the surface of the outer laminates 28.

In this embodiment, the aperture 30 is provided with a colored insert 36 which is fabricated of a highly durable material such as plastic. The color indicates the chain type that mates with that particular bar (or vice versa). (It is to be understood that color as used herein refers to a difference in visual appearance and may be shading differences, cross hatching or the like.) The color by itself may enable a user to select the proper saw chain for that guide bar. The identifying indicia provided by the colored insert 36 in the aperture 30 will also enable a user to identify a replacement guide bar 16.

The colored insert 36 is sized to compressively fit in the aperture 30. The insert 36 may further be physically stamped (impressed) with characters such as letters and numbers in cases where more information is needed than a single color indicator. For example, a letter or digit may be used to indicate the bar's tail type, e.g., for identifying a bar that not only fits a certain chain (color indicator) but which is matched to fit a particular chain saw brand. A second letter or digit may indicate loop length. The material of the insert and the means of stamping the insert may be selected to best accomplish the identification objectives, i.e., a material that can be deeply impressed with a stamping to reduce the likelihood of it being worn off.

Figure 4:
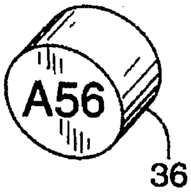
FIG. 4 is an enlarged view of an insert installable in an aperture of the guide bar of FIG. 2.

FIG. 4 illustrates the insert 36 in an enlarged view. As illustrated, the insert 36 is stamped with the letter A and the numeral 56. The letters and numerals are preferably stamped such that they are indented or impressed into the material of the insert 36 and thus will remain visible after extended use of the guide bar 16.

As previously mentioned, the insert 36 is colored and thus will provide an identity for the guide bar 16 when the insert 36 is mounted in the aperture 30 of the guide bar 16. In this embodiment, the color of the insert 36 determines the type of chain 14 that will be fitted to the guide bar 16. The letter A stamped into the insert 36 identifies the type of mounting tail of the guide bar 16 for fitting the particular power head 12. The numeral designation stamped into the insert 36 indicates the number of drive links 22 of the saw chain 14 and in this embodiment the number of drive links is indicated by the number 56 stamped into the end of the insert 36. The number of drive links 22 of the saw chain 14 essentially determines the loop length of the saw chain 14 and is used commonly as a reference.

When a user desires to replace the guide bar 16 and/or saw chain 14 for the power head 12, the user will simply look at the color of the insert 36 and determine the letter and numerals stamped on the insert 36 (if necessary). Typically replacement guide bars 16 and saw chain 14 are individually packaged and sold separately by suppliers. The user will when replacing the guide bar 16 and/or the saw chain 14 go to a supplier with the information (color alone or color and stamped indicia) obtained from the insert 36 and simply find a displayed bar or chain having that matches.

To select a guide bar 16 using the information of insert 36 in FIG. 4, the user will select a guide bar 16 that has the same colored insert 36 as his old guide bar 16 and will further select a guide bar 16 that has the same letter and numerals indented or stamped into the insert 36.

Similarly, the user will select saw chain based on the information on the colored insert 36. The packaging of the saw chain is color coded the same as the insert 36 (i.e., the insert is simply exposed through the packaging), and from the numeral indication on the insert 36 the user will select the proper chain length by selecting a saw chain 14 having the same number of drive links as is stamped on the colored insert 36. In this embodiment the number of drive links is 56 as indicated by the number 56 stamped into the insert 36 as shown in FIG. 4.

The user utilizing the indicia provided by the colored insert will assure the user that he will obtain or procure a guide bar 16 that will fit his power head 12 and further will have selected the proper saw chain 14 that will be of the correct type to fit the guide bar 16 and the drive sprocket and further will be of the proper length to encircle the guide bar 16 and the drive sprocket of the power head 12.

FIG. 2 illustrates a guide bar 16 of laminated construction. However, it is recognized that the same is applicable to a bar constructed of a solid material. A bar fabricated out of a sold piece of material will typically have similar apertures provided for locating the bar 16 during the machining of the guide groove 24. The aperture 30 and mounting slot 40 will serve as a locating reference so that the guide groove 24 of the guide bar 16 will be properly machined. The insert 36 is installed in the aperture provided in the nose end of the solid bar to provide the identifying indicia to enable a user to select the proper guide bar and/or saw chain for the power head.

It will be understood that the complexity of indicia applied to the inserts is in part a matter of satisfying inventory requirements. A different color could be provided for each and every guide bar and saw chain combination. That is, the color could indicate gauge, pitch and length and for some applications that may be desired. Also, the bar may be provided with two or more inserts each having a different color (code) or even the same insert having multiple colors.

Those skilled in the art will recognize that modifications and variations may be made without departing from the true spirit and scope of the invention. The aperture provided in the center laminate 26 may for example be of other configurations other than circular, i.e., the aperture may be of hexagon shape (or other) without compromising the locating feature of the aperture. The other than circular configuration of the aperture in the center laminate 26 will enhance the retention of the insert 36 in the aperture 30 of the guide bar 16. Additionally, the colored insert may have markings stamped on both ends to further identify the guide bar and/or saw chain. The invention is therefore not to be limited to the embodiments described and illustrated but is to be determined from the appended claims.

What is claimed is:

1. An improved chain saw comprising:

a power head;

a guide bar removably mounted to said power head and having a bar surface, an aperture provided in said guide bar;

an insert differentiated from the bar by color installed in said aperture without protruding from the bar surface, said color provided at an exposed surface of said insert and to a depth below the exposed surface of the insert to resist wearing during the use of the chain saw.

2. A chain saw as defined in claim 1, wherein:

said guide bar has a specified groove configuration for receiving a specified chain configuration;

said insert colored to indicate said specified chain configuration for said specified groove configuration.

3. A chain saw as defined in claim 2, wherein:

said guide bar has a specified mounting tail type;

said insert stamped with a character to indicate said specified mounting tail type.

4. A chain saw bar as defined in claim 3, wherein:

said insert is further stamped with a character to indicate a specified chain length.

5. A guide bar mountable to a chain saw for supporting a saw chain, said guide bar comprising:

an elongate bar having a tail end that is removably mountable to a power head of the chain saw;

said elongate bar having a guide groove for receiving said saw chain and an aperture provided in said elongate bar;

an insert colored to a depth from an exposed surface thereof to avoid wearing, said insert installed in said aperture and said color identifying the type of said saw chain.

6. A guide bar as defined in claim 5, wherein:

said insert is stamped with indicia identifying a determined length of the saw chain.

7. A guide bar as defined in claim 5, wherein:

said elongate bar has a specified mounting tail type;

said insert stamped with a character to indicate said specified mounting tail type.

8. A guide bar as defined in claim 5, wherein:

said aperture is provided in said elongate bar initially as a positioning guide for positioning the elongate bar during manufacturing operations.

* * * * *

UNITED STATES PATENT AND TRADEMARK OFFICE

CERTIFICATE OF CORRECTION

PATENT NO. : 5,649,367

DATED : July 22, 1997

INVENTOR(S) : Hille

It is certified that error appears in the above-indentified patent and that said Letters Patent is hereby corrected as shown below:

Claim 4. Col. 5, line 1, delete "bar".

Signed and Sealed this

Ninth Day of September, 1997

Attest:

BRUCE LEHMAN

*Attesting Officer* *Commissioner of Patents and Trademarks*